United States Patent Office 3,336,280
Patented Aug. 15, 1967

3,336,280
PROCESS FOR PRODUCTION OF
RUBBERY POLYMERS
Floyd E. Naylor, Bartlesville, Okla., assignor to Phillips
Petroleum Company, a corporation of Delaware
No Drawing. Filed Oct. 14, 1960, Ser. No. 62,552
11 Claims. (Cl. 260—94.3)

This invention relates to a process for polymerizing 1,3-butadiene so as to obtain rubbery polymers. In one aspect, the invention relates to a process for producing a polybutadiene containing a high percentage of 1,2-addition.

In recent years there has been a great deal of activity in the development of processes for producing olefin polymers. Polymers of monoolefins, such as ethylene and pyropylene, prepared by these processes have received wide acceptance by many industries. The more recent discovery in the field of diene polymerization of certain so-called stereospecific catalysts, which make possible the formation of polymers having a desired configuration, has aroused considerable interest. The polymers formed by the use of these catalysts often have outstanding physical properties which render them equal to or even superior to natural rubber. The present invention is concerned with a novel and improved process for preparing a polybutadiene containing a high percentage of 1,2-addition.

It is an object of this invention to provide a novel process for producing a rubbery polymer of 1,3-butadiene.

Another object of the invention is to provide a process for polymerizing 1,3-butadiene in which the rubbery polymer product produced contains a high percentage of 1,2-addition.

A further object of the invention is to provide a new and improved catalyst system containing molybdenum pentachloride, which is effective in polymerizing 1,3-butadiene to a polybutadiene containing a high percentage of 1,2-addition.

Other and further objects and advantages of the invention will become apparent to those skilled in the art upon consideration of the accompanying disclosure.

In my copending U.S. patent application, Ser. No. 719,486, filed Mar. 6, 1958, there is disclosed a process for preparing rubbery polymers of butadiene with catalysts containing molybdenum pentachloride. Used in conjunction with the molybdenum pentachloride in the catalyst system is a complex metal hydride or an organo compound of gallium, lead, zinc, mercury or indium. Although organoaluminum compounds have been extensively used in many catalyst systems, these compounds were found to be unsatisfactory for use in the catalyst system with molybdenum pentachloride. Thus, when employing a catalyst consisting of molybdenum pentachloride and a trialkylaluminum in polymerizing butadiene, only very low yields of a resinous, insoluble polymer is obtained. According to the present invention, it has now been discovered that butadiene can be polymerized in the presence of a catalyst system comprising an organoaluminum compound and molybdenum pentachloride so as to obtain a high vinyl, rubbery polymer if the polymerization is conducted in the presence of a minor amount of a promotor such as an aliphatic or cyclic mono- or polyether, an amine, or an amide. When operating in this manner, at least 80 percent, e.g., in the range of 85 to 95 percent and higher, of the polymer product is formed by 1,2-addition of the butadiene.

The catalyst used in the practice of the present invention comprises molybdenum pentachloride and an organoaluminum compound having the formula $R_3Al$, wherein R is an alkyl, alkaryl, aryl, aralkyl or cycloalkyl radical. The hydrocarbon radical preferably contains from 1 to 20, inclusive, carbon atoms. Examples of compounds corresponding to the formula $R_3Al$ include trimethylaluminum, triethylaluminum, triisobutylaluminum, tri-n-decylaluminum, tri - sec - eicosylaluminum, tribenzylaluminum, triphenylaluminum, trinaphthylaluminum, tri-p-tolylaluminum, tricyclohexylaluminum, tri(4-methylcyclohexyl)aluminum, tri(4-butylcyclohexyl)aluminum, tri(4-cyclohexylbutyl)aluminum, and the like.

As mentioned previously, the polymerization process of this invention is conducted in the presence of certain compounds which promote the formation of rubbery rather than resinous products. The results obtained by adding these compounds, termed herein promoters, were completely unexpected. Their use makes possible the production of soluble, rubbery products having many important applications. The promoters used in the practice of the invention are ethers, amines and amides, and they preferably contain up to and including 20 carbon atoms, per molecule with the hydrocarbon radicals each containing from 1 to 12, inclusive, carbon atoms. The promoters are preferably selected from the group consisting of dialkyl ethers; cyclic ethers; ethers of ethylene glycol; tertiary amines, which may contain not more than one aryl group; N,N-dialkyl-substituted amides; and alkylideneamines. These latter compounds are often referred to Schiff bases, i.e., the reaction product formed by the reaction of a primary amine with an aldehyde or ketone. Examples of compounds suitable for use as promoters include dimethyl ether, diethyl ether, diisopropyl ether, di-n-propyl ether, di-n-butyl ether, di-n-octyl ether, didecyl ether, methyl ethyl ether, ethyl n-propyl ether, tert-butyl n-dodecyl ether, n-hexyl n-decyl ether, di-tert-heptyl ether, tetramethylene oxide (tetrahydrofuran), 1,3-dioxane, 1,4-dioxane, 1,2-dimethoxyethane, 1,2-diethoxyethane, 1,2 - di - n - propoxyethane, methoxyethoxyethane, methoxy-n-pentoxyethane, ethoxy - n - hexoxyethane, di-n-nonoxyethane, trimethylamine, triethylamine, tri-n-propylamine, tri-n-butylamine, tri-tert-butylamine, tri-n-hexylamine, methyldiethylamine, dimethylhexylamine, n-butyl-di-n-octylamine, di-tert-butyl-n-dodecylamine, methylethyl-n-propylamine, N,N-dimethylaniline, N-methyl-N-ethylaniline, N,N-diisopropylaniline, N,N-di-n-butylaniline, N-ethyl-N-dodecylaniline, N,N-di-n-butyl-4-toluidine, N-methylmorpholine, N-octylmorpholine, N-tert-hexylmorpholine, N-dodecylmorpholine, pyridine, 2,4,6-trimethylpyridine, 3,5-di-n-hexylpyridine, 4-tert-butylpyridine, N-methylpiperidine, N-isopropylpiperidine, N-dodecylpiperidine, N,N-dimethylformamide, N,N-diethylacetamide, N-methyl - N - n-butylpropionamide, N,N-di-n-hexylcaprylamide, N,N-di - n - octylformamide, N-benzylideneaniline, N-propylideneaniline, N-butylideneaniline, N - (1 - ethylbutylidene)-4-toluidine, N-(1-n-butyloctylidene) aniline, N-butylidene-n-butylamine, N-ethylidenethylamine, N-benzylidenethylamine, and N-benzylidenedodecylamine.

The amount of the organoaluminum compound present in the catalyst system is usually in the range of 0.8 to 3, preferably from 1 to 2, mols of the organoaluminum compound per mol of molybdenum pentachloride. The amount of the catalyst which is used in the polymerization can vary over a relatively wide range. However, the concentration of the total catalyst composition is generally in the range of 0.1 to 10 weight percent or higher, preferably in the range of 0.25 to 6.0 weight percent, based on the total amount of 1,3-butadiene charged to the polymerization reaction.

The amount of the promotor used in the process can vary within rather wide limits and is dependent upon several factors. For optimum results, the amount of the promotor depends upon the particular compound used as well as upon the organoaluminum compound employed in the catalyst system. In general, it is only necessary to employ a relatively small amount of the promotor. In some instances, a large excess of promotor can be tolerated without deleterious effects on the conversions while in other cases a marked decrease in conversion is observed as the amount of promotor is increased above the optimum. The amount of promotor will usually be in the range of 0.1 to 30 mols per mol of molybdenum pentachloride. However, the preferred ratio is from 0.5 to 10 mols of promotor per mol of molybdenum pentachloride, and very freqently less than 4 or 5 mols of the promotor per mol of molybdenum pentachloride is employed. Furthermore, it has been found that in many instances the optimum quantity of the promotor is in the neighborhood of 1 mol of the promotor per mol of molybdenum pentachloride. It is usually desired to employ as little of the promotor as possible while still obtaining a rubbery polymer having a high vinyl content, and operation in this manner is well within the capabilities of those skilled in the art.

It is usually preferred to carry out the polymerization in the presence of a diluent. Diluents suitable for use in the polymerization process are hydrocarbons which are not detrimental to the polymerization reaction and which are liquid under the conditions of the process. It is generally preferred to utilize as diluents aromatic hydrocarbons, such as toluene, benzene, ethylbenzene, xylene, and the like. Cycloaliphatic hydrocarbons, such as cyclohexane, cyclopentane, methylcyclohexane, and the like can also be used although they are less desirable than the aromatic hydrocarbons.

The polymerization process of this invention can be carried out at temperatures varying over a rather broad range. It is usually preferred to operate at a temperature between zero and about 150° C., and more desirably at a temperature in the range of 10 to 80° C. The polymerization can be carried out under autogenous pressure or any pressure suitable for maintaining the reaction mixture substantially in the liquid phase. The pressure will thus depend upon the particular diluent being employed and the temperature at which the polymerization is conducted. However, higher pressures can be employed if desired, these pressures being obtained by some such suitable method as the pressurization of the reactor with a gas which is inert with respect to the polymerization reaction.

The process of this invention can be carried out in a conventional batch operation or in a continuous operation. When operating as a batch process, according to one charging procedure, the diluent, catalyst components and promotor are added to the reactor prior to addition of the 1,3-butadiene. It is frequently preferred to add the diluent, molybdenum pentachloride, promotor and organoaluminum compound in that order prior to charging the 1,3-butadiene. However, it is to be understood that the invention is not to be limited to any particular charging procedure. The process can also be carried out continuously by maintaining the above-mentioned concentrations of reactants in the reactor for a suitable residence time. The residence time in a continuous process will, of course, vary within rather wide limits depending upon such variables as temperature, pressure, the ratio of catalyst components, and the catalyst concentration. In a continuous process, the residence time will usually fall within the range of 1 second to 5 hours when conditions within the specified ranges are employed. When a batch process is being utilized, the time for the reaction can be as high as 24 hours or more.

Various materials are known to be detrimental to the catalyst composition of this invention. These materials include carbon dioxide, oxygen and water. It is desirable, therefore, that the 1,3-butadiene be freed of these materials as well as other materials which may tend to inactivate the catalyst. Any of the known means for removing such contaminants can be used. Furthermore, when a diluent is used in the process, it is preferred that this material be substantially free of impurities such as water, oxygen and the like. In this connection, it is desirable to remove air and moisture from the reaction vessel in which the polymerization is to be conducted. Although it is preferred to carry out the polymerization under anhydrous or substantially anhydrous conditions, it is to be understood that some small amounts of these catalyst-inactivating materials can be tolerated in the reaction mixture. However, it is also to be understood that the amount of such materials which can be tolerated in the reaction mixture is insufficient to cause complete deactivation of the catalyst.

Upon completion of the polymerization reaction, when a batch process is used, the reaction mixture is then treated to inactivate the catalyst and recovery the rubbery product. Any suitable method can be utilized in carrying out this treatment of the reaction mixture. In one method, the polymer is recovered by steam stripping the diluent from the polymer. In another suitable method, a catalyst-inactivating material, such as an alcohol, is added to the mixture so as to inactivate the catalyst and cause precipitation of the polymer. The polymer is then separated from the alcohol and diluent by any suitable method, such as decantation or filtration. It is often preferred to add initially only an amount of the catalyst-inactivating material which is sufficient to inactivate the catalyst without causing precipitation of the dissolved polymer. It has also been found to be advantageous to add an antioxidant, such as phenyl-beta-naphthylamine, to the polymer solution prior to recovery of the polymer. After addition of the catalyst-inactivating agent and the antioxidant, the polymer present in the solution can then be separated by the addition of an excess of a material such as ethyl alcohol or isopropyl alcohol. When the process is carried out continuously, the total effluent from the reactor can be pumped from the reactor to a catalyst-inactivating zone where the reactor effluent is contacted with a suitable catalyst-inactivating material, such as an alcohol. When an alcohol is used as the catalyst-inactivating material, it also functions to precipitate the polymer. In the event catalyst-inactivating materials are employed which do not perform this dual role, a suitable material, such as an alcohol, can then be added to precipitate the polymer. It is, of course, to be realized that it is within the scope of the invention to employ other suitable means to recover the polymer from solution. After separation from the water or alcohol and diluent by filtration or other suitable means, the polymer is then dried.

The polybutadiene produced in accordance with the process of this invention is a rubbery polymer having at least 80 percent 1,2-addition. The term "rubbery polymer" as used herein includes elastomeric, vulcanizable polymeric material which after vulcanization, i.e., crosslinking, possesses the properties normally associated with vulcanized rubber, including materials which when compounded and cured exhibit reversible extensibility at 80° F. of over 100 percent of a specimen's original length with a retraction of at least 90 percent within one minute after release of the stress necessary to elongate to 100 percent. With regard to the solubility of the rubbery polymer of this invention, it has been possible by the present process to obtain polymers which contain substantially no gel as determined by the standard gel determination test. The below-described procedure is followed in carrying out this test. If the gel content is expected to be below 50 percent, the sample of polymer to be tested for gel should weigh from 0.10 to 0.13 gram while if the gel content is expected to be above 50 percent, a sample weighing from 0.13 to 0.18 is used. The sample is placed in a cage of calibrated weight, fabricated from 80-mesh 18-8 stainless steel screen. The cage containing the polymer is then placed in a 4-ounce wide mouthed bottle into which 100 milliliters of reagent grade benzene is pipetted. The bottle is then capped tightly with a threaded cap, fitted with a cardboard gasket and protected with a circle of aluminum foil. The bottle is then placed in the dark and allowed to stand at room temperature for at least 24 hours and preferably not more than 48 hours. No shaking or stirring of the contents is permissible during this dissolution. At the end of this period, the cage is withdrawn from the bottle and placed in a wide mouthed 2-ounce bottle. The weight of the gel which is adhering to the cage is calculated and expressed as swelled gel. The cage containing the gel is then dried in a vacuum oven maintained at a temperature between 70 and 80° C. after which the weight of dried gel is determined. The gel is then calculated as the weight percent of the rubbery polymer which is insoluble in benzene. The swelling index is determined as the weight ratio of swelled gel to dried gel.

The rubbery polymers of this invention can be compounded and vulcanized in a manner similar to that used in the past for compounding natural and synthetic rubber. Vulcanization accelerators, vulcanizing agents, reinforcing agents, and fillers such as have been used in natural rubber can likewise be used when compounding the rubbers of this invention. The rubbery polymers produced in accordance with the invention have utility and applications where natural and synthetic rubbers are used. They can be used in the manufacture of automobile tires and other rubber articles, such as gaskets, tubing, covering for wiring cable, rubber heels, rubber tile, and the like.

A more comprehensive understanding of the invention can be obtained by referring to the following illustrative examples, which are not intended, however, to be unduly limitative of the invention.

Samples of certain of the polymer products produced in the runs described in the examples were examined by infrared analyses. This work was carried out in order to determine the percentage of the polymer formed by 1,2-addition of the butadiene. The procedure used in making the determinations is described hereinafter.

The polymer samples were dissolved in carbon disulfide to form a solution having 25 grams of polymer per liter of solution. The infrared spectrum of each of the solutions (percent transmission) was then determined in a commercial infrared spectrophotometer. The percent of total unsaturation present as trans 1,4-was calculated according to the following equation and consistent units:

$$\epsilon = \frac{E}{tc}$$

where $\epsilon$ equals extinction coefficient (liters-mols$^{-1}$-centimeters$^{-1}$); E equals extinction ($\log^{10} I$); $t$ equals path length (centimeters); and $c$ equals concentration (moles double bond/liter). The extinction was determined at the 10.35 micron band. The extinction coefficient was 126 (liters-mols$^{-1}$-centimeters$^{-1}$).

The percent of the total unsaturation as 1,2-(vinyl) was calculated according to the above equation, using the 11.0 micron band. The extinction coefficient was 173 (liters-mols$^{-1}$-centimeters$^{-1}$).

EXAMPLE I

Butadiene was polymerized to a rubbery polymer using different promotors and with a catalyst system consisting of triisobutylaluminum and molybdenum pentachloride. The molybdenum pentachloride used was commercial grade (Climax Molybdenum Company) and was ball milled and passed through an 80 mesh screen before use. The 1,3-butadiene was a special purity grade, which prior to use was distilled through ethylene glycol and stored at about −20° C. over Drierite (calcium sulfate). The toluene was distilled and then purified further by passing it downward through a column packed with stainless steel Heli-Pak while nitrogen was passed upwardly through the column.

The polymerization recipe was as follows:

*Recipe*

| | |
|---|---|
| Butadiene _____parts by weight__ | 100 |
| Toluene _____do____ | 1200 |
| Triisobutylaluminum (4.8 mmoles) _____do____ | 0.95 |
| Molybdenum pentachloride (4.0 mmoles) __do____ | 1.1 |
| Promotor _____ | Variable |
| Temperature, ° F. _____ | [1] 122 |
| Time, hours _____ | Variable |

[1] (50° C.)

Polymerization was effected in seven-ounce beverage bottles. Toluene was charged first followed by a three-minute purge with prepurified nitrogen at the rate of three liters per minute. The molybdenum pentachloride was then added as a solid after which each bottle was sealed with a self-sealing gasket, which had been previously extracted with toluene, and capped with a crown bottle cap which was punched so as to expose a portion of the self-sealing gasket. The promoter was then added followed by triisobutylaluminum in solution in toluene. The butadiene was charged last to the bottles. These latter materials were introduced from calibrated syringes with the syringe needle used for charging being inserted through the gasket.

After all ingredients were charged the bottles were placed in a 50° C. bath and tumbled throughout the polymerization period. At the end of this time the bottles were removed, and to each there was added 50 ml. of a solution of an antioxidant which was either phenyl-beta-naphthylamine or AO 2246 [2,2′-methylene-bis(4-methyl-6-tert-butylphenol)]. The antioxidant solution was prepared by dissolving 52 grams of the compound in four liters of toluene and adding 100 ml. of isopropanol. The isopropanol served as a shortstop for the reaction. The contents of each bottle, after addition and thorough mixing of the antioxidant solution, were poured into approximately one liter of isopropanol and the mixture was stirred vigorously. The polymer which precipitated was separated and dried overnight (12–16 hours) in a vacuum oven at 50° C.

The quantities of promotors charged and the results obtained in the several runs are shown below in Table I.

TABLE I

| Run No. | Promotor | Parts [1] | Mmoles [2] | Mole Ratio, Promotor:MoCl₅ | Poly-Time, hrs. | Conv., | Inh. Visc. |
|---|---|---|---|---|---|---|---|
| 1 | Diethyl ether | 7.4 | 100 | 25:1 | 21 | 40 | 3.65 |
| 2 | None | | | | 21 | ([2]) | |
| 3 | Diethyl ether | 0.25 | 3.4 | 0.85:1 | 16 | 9 | |
| 4 | ----do---- | 1.0 | 13.5 | 3.4:1 | 16 | 35 | |
| 5 | ----do---- | 5.0 | 67.5 | 16.9:1 | 16 | 51 | |
| 6 | ----do---- | 25 | 338 | 84.5:1 | 16 | 0 | |
| 7 | Triethylamine | 0.5 | 5.0 | 1.25:1 | 16 | 80 | 4.04 |
| 8 | ----do---- | 10 | 99 | 24.8:1 | 16 | 100 | 4.63 |
| 9 | Tetrahydrofuran | 0.5 | 6.9 | 1.7:1 | 16 | 75 | 3.94 |
| 10 | ----do---- | 10 | 139 | 34.8:1 | 16 | 0 | |
| 11 | ----do---- | 0.29 | 4 | 1:1 | 21 | 75 | |
| 12 | Dimethylaniline | 0.48 | 4.0 | 1:1 | 17 | 81 | |
| 13 | ----do---- | 1.45 | 12.0 | 3:1 | 17 | 58 | |
| 14 | Pyridine | 0.15 | 1.9 | 0.48:1 | 16 | [3] 10 | |
| 15 | 1,2-dimethoxyethane | 0.18 | 2 | 0.5:1 | 17 | [4] 4.2 | |
| 16 | ----do---- | 0.36 | 4 | 1:1 | 17 | 42 | 5.39 |
| 17 | ----do---- | 1.08 | 12 | 3:1 | 17 | 20 | |
| 18 | ----do---- | 5.4 | 60 | 15:1 | 17 | 33 | |
| 19 | Dimethylformamide | 0.15 | 2 | 0.5:1 | 18 | 67 | |
| 20 | ----do---- | 0.29 | 4 | 1:1 | 18 | 8 | 4.77 |
| 21 | ----do---- | 0.88 | 12 | 3:1 | 18 | 8 | |
| 22 | Dioxane | 0.18 | 2 | 0.5:1 | 17 | [5] 12 | |
| 23 | ----do---- | 0.70 | 8 | 2:1 | 17 | 15 | |
| 24 | N-methylmorpholine | 0.20 | 2 | 0.5:1 | 17 | 53 | |
| 25 | ----do---- | 0.40 | 4 | 1:1 | 17 | 79 | |
| 26 | ----do---- | 0.81 | 8 | 2:1 | 17 | 84 | |
| 27 | Benzylideneaniline | 0.36 | 2 | 0.5:1 | 17 | 16 | |
| 28 | ----do---- | 0.72 | 4 | 1:1 | 17 | 13 | |

[1] Quantities expressed per 100 parts monomers.
[2] About 2-3% of an insoluble resin was formed.
[3] Contained 2.50% insoluble resin.
[4] Contained 1.7% insoluble resin.
[5] Contained 1% insoluble resin.

Except where indicated, all of the foregoing products were rubbery polymers. Infrared analysis was made on three of the polymers, and the results were as follows:

| Run | Trans, percent | Vinyl, percent |
|---|---|---|
| 1 | 3.6 | 88.1 |
| 9 | 3.8 | 89.9 |
| 14 | 4.0 | [1] 90.0 |

[1] Approximate value.

Examination of the data reveals that the best promoting effects are obtained in a triisobutylaluminum polymerization system when the mole ratio of promotor to molybdenum pentachloride is 3:1 or below and frequency about 1:1. With ethers such as diethyl ether and dimethoxyethane, larger amounts can be tolerated. The optimum amount is determined by the promotor used, and in many cases a marked decrease in conversion is observed as the quantity of promotor is increased beyond this point.

EXAMPLE II

Different promotors were used in a triethylaluminum-molybdenum pentachloride polymerization recipe. Except for 4.8 millimoles of triethylaluminum, the polymerization recipe was the same as that described in Example I. The polymerizations were conducted at 50° C. for a period of 17 hours. The results of the runs are set forth below in Table II.

TABLE II

| Run No. | Promotor Compound | Mmoles | Mole Ratio Promotor:MoCl₅ | Conv., percent | Inh. Visc. | Gel, percent |
|---|---|---|---|---|---|---|
| 1 | Triethylamine | 50 | 12.5:1 | 84 | | |
| 2 | ----do---- | 20 | 5:1 | 75 | 4.97 | 0 |
| 3 | Diethyl ether | 68 | 17:1 | [1] 72 | | |
| 4 | ----do---- | 20 | 5:1 | [2] 18 | 2.19 | 0 |
| 5 | 1,2-dimethoxyethane | 60 | 15:1 | 76 | | |
| 6 | ----do---- | 20 | 5:1 | 21 | | |
| 7 | Dimethylaniline | 40 | 10:1 | [1] 33 | | |
| 8 | Tetrahydrofuran | 70 | 17.5:1 | 88 | | |
| 9 | ----do---- | 20 | 5:1 | 86 | 3.92 | trace |
| 10 | ----do---- | 4 | 1:1 | [2] 66 | 4.52 | 0 |
| 11 | ----do---- | 8 | 2:1 | 80 | | |
| 12 | ----do---- | 16 | 4:1 | 95 | | |
| 13 | ----do---- | 32 | 8:1 | 95 | 3.72 | 0 |

[1] Contained 1-2% insoluble resin in addition to the soluble vinyl polymer reported.
[2] Contained small amount of insoluble resin in addition to the soluble vinyl polymer reported.

The data in Table II show that good results can be obtained with relatively large quantities of the promotors.

As will be evident to those skilled in the art, many variations and modifications of this invention can be practiced in view of the foregoing disclosure. Such variations and modifications are believed to come within the spirit and scope of the invention.

I claim:

1. A process for preparing a rubbery polybutadiene containing at least 80 percent of 1,2-addition which comprises contacting 1,3-butadiene under polymerization conditions with a catalyst comprising molybdenum pentachloride and a compound having the formula $R_3Al$, wherein R is selected from the group consisting of alkyl, aryl, alkaryl, aralkyl and cycloalkyl radicals, said contacting occurring in the presence of a promotor compound selected from the group consisting of dialkyl ethers, cyclic ethers, ethers of ethylene glycol, tertiary amines containing not more than one aryl group, N,N-dialkyl-substituted amides, and alkylideneamines.

2. A process according to claim 1 in which said $R_3Al$ compound is triisobutylaluminum and said promotor compound is diethyl ether.

3. A process according to claim 1 in which said $R_3Al$ compound is triisobutylaluminum and said promotor compound is N-methylmorpholine.

4. A process according to claim 1 in which said $R_3Al$ compound is triisobutylaluminum and said promotor compound is triethylamine.

5. A process according to claim 1 in which said $R_3Al$ compound is triethylaluminum and said promotor compound is 1,2-dimethoxyethane.

6. A process according to claim 1 in which said $R_3Al$ compound is triethylaluminum and said promotor compound is tetrahydrofuran.

7. A process for preparing a rubbery polybutadiene containing at least 80 percent of 1,2-addition which comprises contacting 1,3-butadiene under polymerization conditions with a catalyst comprising molybdenum pentachloride and a compound having the formula $R_3Al$, wherein R is selected from the group consisting of alkyl, aryl, alkaryl, aralkyl and cycloalkyl radicals, said contacting occurring in the presence of a promotor compound selected from the group consisting of dialkyl ethers, cyclic ethers, ethers of ethylene glycol, tertiary amines containing not more than one aryl group, N,N-dialkyl-substituted amides, and alkylideneamines, said compound containing up to and including 20 carbon atoms per molecule, and a hydrocarbon diluent at a temperature in the range of zero to 150° C. and at a pressure sufficient to maintain the reaction mixture in the liquid phase; and recovering the rubbery polymer of butadiene so produced.

8. The process according to claim 7 in which the amount of said $R_3Al$ compound is in the range of 0.8 to 3 mols of said compound per mol of said molybdenum pentachloride and the amount of said promotor compound is in the range of 0.1 to 30 mols per mol of said molybdenum pentachloride.

9. A process for preparing a rubbery polybutadiene containing at least 80 percent of 1,2-addition which comprises contacting 1,3-butadiene under polymerization conditions with a catalyst comprising molybdenum pentachloride and a compound having the formula $R_3Al$, wherein R is selected from the group consisting of alkyl, aryl, alkaryl, aralkyl and cycloalkyl radicals, said contacting occurring in the presence of a promotor compound selected from the group consisting of dialkyl ethers, cyclic ethers, ethers of ethylene glycol, tertiary amines containing not more than one aryl group, N,N-dialkyl substituted amides, and alkylideneamines, said promotor compound being used in an effective amount but not exceeding 30 mols per mol of molybdenum pentachloride.

10. The process of claim 9 wherein said promotor compound is used in an amount of 0.5 to 10 mols per mol of molybdenum pentachloride.

11. The process of claim 9 wherein the concentration of molybdenum pentachloride and $R_3Al$ compound is used in the range of 0.1 to 10 weight percent based on the amount of 1,3-butadiene charged, the $R_3Al$ compound is used in the amount of 0.8 to 3 mols per mol of molybdenum pentachloride and the promotor compound is used in the amount of 0.1 to 30 mols per mol of molybdenum pentachloride.

References Cited

UNITED STATES PATENTS 2,900,372   8/1959   Gresham _____ 260—94.9

FOREIGN PATENTS

| 215,043   | 11/1956 | Australia.     |
| 554,242   | 5/1957  | Belgium.       |
| 1,221,244 | 1/1960  | France.        |
| 809,717   | 3/1959  | Great Britain. |
| 820,264   | 8/1959  | Great Britain. |

JOSEPH L. SCHOFER, *Primary Examiner.*

LEON J. BERCOVITZ, M. LIEBMAN, J. R. LIBERMAN, *Examiners.*

E. J. SMITH, M. JACOBS, R. A. GAITHER,
*Assistant Examiners.*